United States Patent [19]  [11] 3,894,966
Conway  [45] July 15, 1975

[54] METHOD OF MANUFACTURING AN EXTRUDED CATALYST COMPOSITION

[75] Inventor: John E. Conway, La Grange, Ill.

[73] Assignee: Universal Oil Products Company, Des Plaines, Ill.

[22] Filed: Oct. 19, 1973

[21] Appl. No.: 408,011

[52] U.S. Cl........... 252/465; 252/466 J; 252/466 PT
[51] Int. Cl.............................................. B01j 23/16
[58] Field of Search............ 252/465, 466 J, 466 PT

[56] References Cited
UNITED STATES PATENTS

| | | | |
|---|---|---|---|
| 3,336,218 | 8/1967 | Hebert et al..................... | 252/465 X |
| 3,425,957 | 2/1969 | Pessimisis........................ | 252/465 X |
| 3,661,805 | 5/1972 | Horvath............................. | 252/465 |
| 3,665,049 | 5/1972 | Cornelius et al................ | 252/465 X |
| 3,669,904 | 6/1972 | Cornelius et al.......... | 252/466 PT X |
| 3,679,762 | 7/1972 | La Hue et al............. | 252/466 PT X |

*Primary Examiner*—Paul F. Shaver
*Attorney, Agent, or Firm*—James R. Hoatson, Jr.; Robert W. Welch; William H. Page, II

[57] ABSTRACT

An extruded catalyst composition characterized by a particle density of from about 1.12 to about 1.25 grams per cubic centimeter and prepared by dry-mixing a finely divided Group VIB metal compound and a Group VIII metal compound with a finely divided alpha-alumina monohydrate having an average bulk density of from about 0.4 to about 0.5. The mixture is extruded at a pressure of less than about 500 psig, dried and calcined. The finished catalyst composition is particularly useful as a hydrodesulfurization catalyst.

7 Claims, No Drawings

METHOD OF MANUFACTURING AN EXTRUDED CATALYST COMPOSITION

This invention relates to the hydrodesulfurization of petroleum hydrocarbon fractions such as residual fuel oils, and to a method for the manufacture of a catalyst composition particularly adapted thereto. It has become well known that oxides of sulfur, plus lesser amounts of other sulfurous compounds, are among the major pollutants of the atmosphere. It has been estimated that, in this country alone, in excess of about 23 million tons of sulfur dioxide has been discharged into the atmosphere on an annual basis. The increasingly deleterious effect of the sulfurous pollutants with respect to cardiorespiratory disease, eye irritation, and the like, has prompted rather severe legislative action to control the amount of sulfur dioxide discharged into the atmosphere, particularly in densely populated areas where the problem is more acute. It has been recognized that the combustion of petroleum products accounts for a substantial portion of said oxides of sulfur and legislation has been effected or proposed which is particularly directed to the limitation of sulfurous compounds in residual fuel oils to be burned in densely populated areas. The supply of residual fuel oils of suitably low sulfur content is entirely inadequate to meet present day requirements and it becomes increasingly important to develop improved desulfurization techniques to treat the more accessible and abundant residual fuel oils of relatively high sulfur content.

Desulfurization technology is presently concerned with hydrotreating and to the development of catalysts that are more selective and/or operate at less severe conditions to obviate hydrocracking of the residual fuel oil. Hydrotreating, or hydrodesulfurization, is generally effected at hydrodesulfurixation reaction conditions including an imposed hydrogen pressure of from about 100 to about 3000 pounds per square inch. Normally, the hydrogen is charged together with recycle hydrogen to provide from about 1000 to about 50,000 standard cubic feet per barrel of hydrocarbon charge. Hydrodesulfurization reaction conditions further include an elevated temperature, usually from about 200° to about 800°F. although temperatures in the higher range, say from about 600° to about 800° F. are most suitable. Also, a sulfur-containing feed stock is generally suitably processed at a liquid hourly space velocity of from about 0.5 to about 20. Hydrodesulfurization catalysts preferably comprise a Group VIB metal, usually molybdenum, and a Group VIII metal, usually nickel or cobalt, on a refractory inorganic oxide carrier material, usually alumina.

It is an object of this invention to present a novel method of manufacturing said hydrodesulfurization catalyst in the form of extruded particles having a particle density which has been found to be particularly critical with respect to optimum hydrodesulfurization activity of the extruded catalyst product.

In one of its broad aspects, the present invention embodies an extruded catalyst composition characterized by a particle density of from about 1.12 to about 1.25 grams per cubic centimeter, and prepared by the method which comprises dry-mixing a finely divided Group VIB metal compound and Group VIII metal compound with a finely divided alpha-alumina monohydrate having an average bulk density of from about 0.4 to about 0.5 grams per cubic centimeter; adding thereto sufficient acidic peptizing agent to produce a dough extrudable through a 1/32 inch –⅛ inch orifice at less than about 500 psig; extruding said dough and calcining the extrudate in an oxidizing atmosphere at a temperature of from about 700° to about 1200° F.; said metal compounds being utilized in an amount to provide a final catalyst product containing from about 4 to about 30 wt. percent Group VIB metal and from about 1 to about 10 wt. percent Group VIII metal.

Other objects and embodiments of this invention will become apparent in the following detailed specification.

In accordance with the present invention, a finely divided Group VIB metal compound and Group VIII metal compound are dry-mixed with a finely divided alpha-alumina monohydrate. The expression "finely divided" is intended as descriptive of particles having an average diameter of less than about 105 microns, for example, particles which are recoverable through a 105 micron microsieve. Dry-mixing is suitably accomplished utilizing a finely divided alpha-alumina monohydrate characterized by a weight loss on ignition at 900° C. of from about 20 to about 30 wt. percent. In addition to its contribution to the catalytic properties of the extruded catalyst product, the finely divided, low average bulk density alpha-alumina monohydrate improves the extrusion characteristics of the mixture whereby the mixture is readily extruded through an orifice or opening preferably in the 1/32 inch–⅛ inch diameter range, at a pressure of less than about 500 psig. While the alumina component of the mixture is characterized by an average bulk density of from about 0.4 to about 0.5 grams per cubic centimeter, a higher density alumina may be employed provided that it is blended with a sufficient quantity of a lower density alumina to result in an alumina blend with an average bulk density in the stated range.

Molybdic anhydride is a particularly suitable Group VIB metal compound, and cobalt carbonate is a particularly suitable Group VIII metal compound for dry-mixing with the alpha-alumina monohydrate as herein contemplated. Other suitable Group VIB metal compounds, that is, compounds of molybdenum, tungsten and chromium, include molybdic acid, ammonium molybdate, ammonium chromate, chromium acetate, chromous chloride, chromium nitrate, tungstic acid, etc. Other Group VIII metal compounds which may be employed, that is, compounds of iron, nickel, cobalt, platinum, palladium, ruthenium, rhodium, osmium and iridium, include nickel nitrate, nickel sulfate, nickel chloride, nickel acetate, cobaltous nitrate, cobaltous sulfate, ferric nitrate, ferric sulfate, platinum chloride, palladium chloride, and the like.

Peptizing agents useful in the present invention include the weak acids such as formic acid, acetic acid, propionic acid, and the like, although the stronger acids such as sulfuric acid, hydrochloric acid, and particularly nitric acid are preferred. In any case, only sufficient peptizing agent is blended or mulled with the mixture to form a dough or plyable plastic mass which is extrudable through a 1/32 inch–⅛ inch orifice or opening at a pressure of less than about 500 psig.

The extrusion operation is suitably effected with commercial extrusion apparatus, for example, the dough is continuously processed through a cylinder by means of a rotating screw, and pressured through a perforated plate at one end of the cylinder at less than about 500 psig. The extrudate may be cut into particles of desired length prior to drying and calcining by means of a rotating knife as the extrudate emerges from the perforated plate. Alternatiively, the extrudate may be broken into particles of random length during the drying and calcining process. In any case, the extrudate is dried and calcined, drying being usually accomplished at temperatures up to about 260° F. over a period of 1-24 hours, and calcining being preferably effected in an oxidizing atmosphere, such as air, at a temperature of from about 600° to about 1200° F. over a period of from 2 to about 4 hours.

Thus, one preferred embodiment of this invention concerns an extruded catalyst composition characterized by a particle density of from about 1.12 to about 1.25 grams per cubic centimeter, and prepared by the method which comprises dry-mixing a finely divided molybdic anhydride and cobalt carbonate with a finely divided alpha-alumina monohydrate having an average bulk density of from about 0.4 to about 0.5 grams per cubic centimeter and characterized by a loss on ignition at 900° C. of from about 20 to about 30 wt. percent; adding sufficient nitric acid thereto to produce a dough extrudable through a 1/32 inch-⅛ inch orifice at a pressure of from about 300 psig to about 500 psig; extruding said dough, and calcining the extrudate in air at a temperature of from about 600° to about 1200° F.

The following example is presented in illustration of one preferred embodiment of this invention and is not intended as an undue limitation on the generally broad scope of the invention as set out in the appended claims.

EXAMPLE

A commercial powered alpha-alumina monohydrate (Catapal SB) having an average bulk density of about 0.79 grams per cubic centimeter and a 26 percent weight loss on ignition at 900° C., was blended with a commercial powdered alpha-alumina monohydrate (Kaiser Medium) having an average bulk density of from about 0.23 grams per cubic centimeter and a 26 percent weight loss on ignition at 900° C., to yield an alpha-alumina monohydrate blend with an average bulk density of about 0.45 grams per cubic centimeter, 95 percent of which was filterable through a 105 micron microsieve. 4500 grams of the alpha-alumina monohydrate blend was thoroughly dry-mixed with 956 grams of a finely powdered, volatile-free, molybdic oxide with an average bulk density of about 0.24 grams per cubic centimeter, and about 199 grams of powdered cobalt carbonate. Approximately 2450 grams of 13 wt. percent nitric acid was then added to the powdered blend in a muller, a mixture being thereby converted to a dough. The mixture was mulled for about an hour and thereafter extruded through a perforated plate comprising 1/32 inch perforations. Extrusion was by means of a screw extruder at a pressure of about 450 psig. The extrudate was dried and calcined in air for about an hour at 750° F. and for an additional hour at 1100° F. The calcined extrudate was broken into particles with an average length of about ⅛ inch. The calcined extrudate particles had a particle density of 1.23 grams per cubic centimeter.

I claim as my invention:

1. A method for preparing an extruded catalyst composition characterized by a particle density of from about 1.12 to about 1.25 grams per cubic centimeter which comprises:
   a. dry mixing a finely divided Group VIB metal compound and Group VIII metal compound with a finely divided alpha-alumina monohydrate having an average bulk density of from about 0.4 to about 0.5 grams per cubic centimeter;
   b. adding thereto sufficient acidic peptizing agent to produce a dough extrudable through a 1/32 inch-⅛ inch diameter orifice at less than about 500 psig;
   c. extruding said dough through a 1/32 inch-⅛ inch diameter orifice at less than about 500 psig; and
   d. calcining the extrudate particles in an oxidizing atmosphere at a temperature of from about 700° to about 1200° F.;
   e. said metal compounds being utilized in an amount to provide a final catalyst product containing from about 4 to about 30 wt. percent Group VIB metal and from about 1 to about 10 wt. percent Group VIII metal.

2. The method of claim 1 further characterized in that said peptizing agent is nitric acid.

3. The method of claim 1 further characterized in that said Group VIB metal compound is a compound of molybdenum.

4. The method of claim 1 further characterized in that said Group VIB metal compound is molybdic anhydride.

5. The method of claim 1 further characterized in that said Group VIII metal compound is a compound of cobalt.

6. The method of claim 1 further characterized in that said Group VIII metal compound is cobalt carbonate.

7. The method of claim 1 further characterized in that said alpha-alumina monohydrate is an alpha-alumina monohydrate having a density of from about 0.7 to about 0.9 blended with an alpha-alumina monohydrate having an average bulk density of from about 0.2 to about 0.3 to yield an alpha-alumina monohydrate blend with an average bulk density of from about 0.4 to about 0.5 grams per cubic centimeter.

* * * * *